March 22, 1955  J. R. HORTON ET AL  2,704,468
POWER TRANSMISSION

Filed Feb. 27, 1951  6 Sheets-Sheet 1

INVENTOR.
Joseph R. Horton,
Adolphus V. Horton,
BY Victor J. Evans & Co.

ATTORNEYS

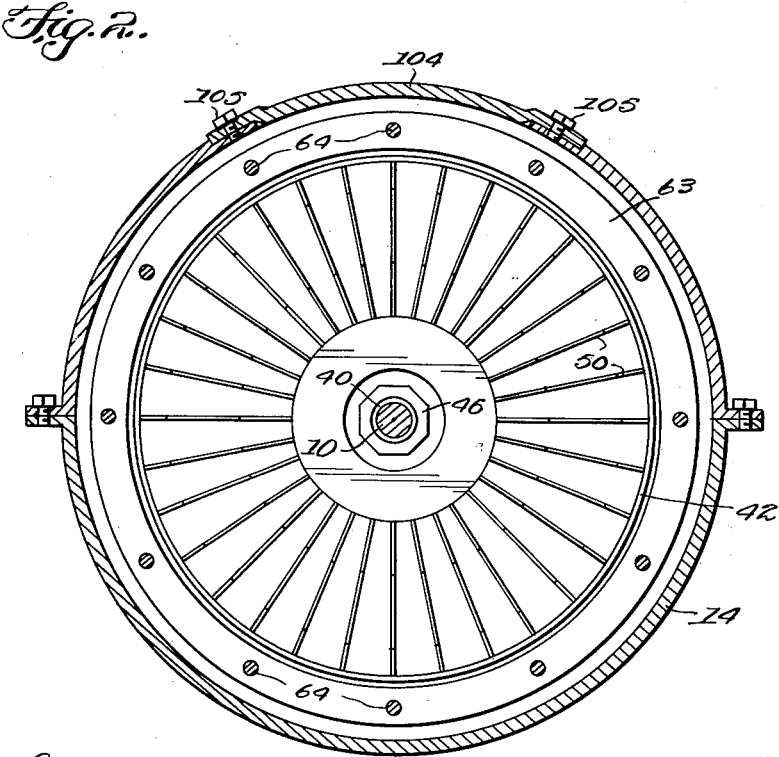
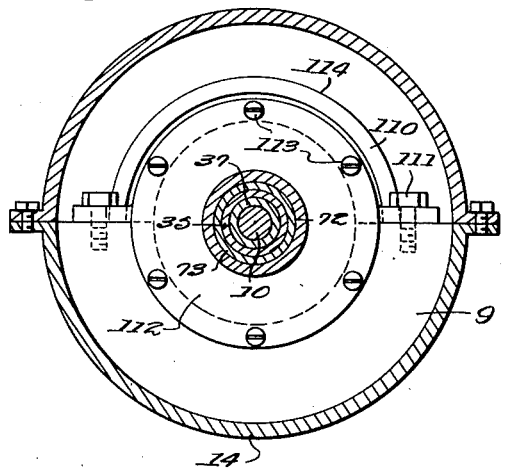
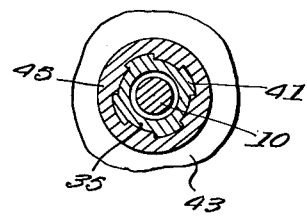

March 22, 1955　　J. R. HORTON ET AL　　2,704,468
POWER TRANSMISSION
Filed Feb. 27, 1951　　6 Sheets-Sheet 3
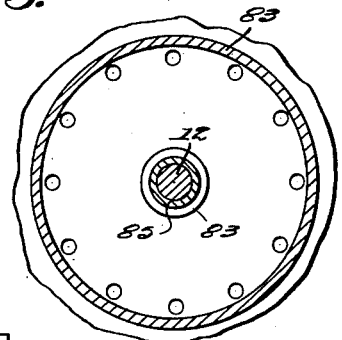
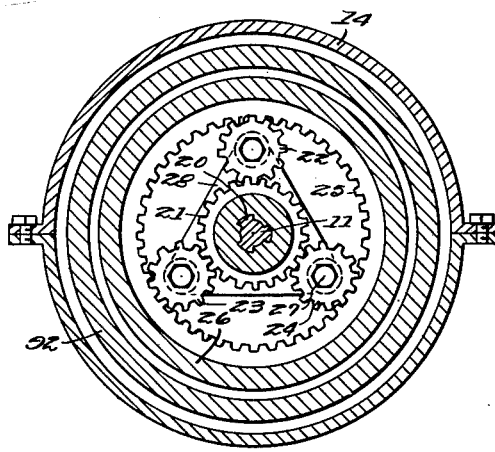
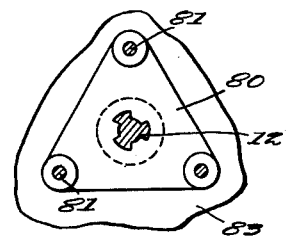
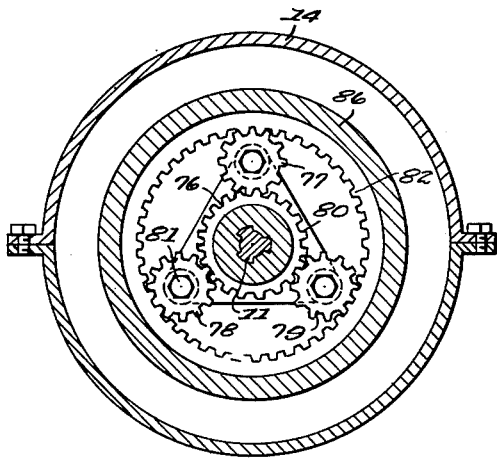
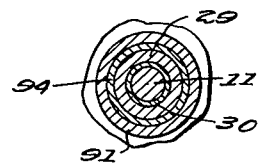
INVENTOR.
Joseph R. Horton,
Adolphus V. Horton,
BY Victor J. Evans &co.
ATTORNEYS

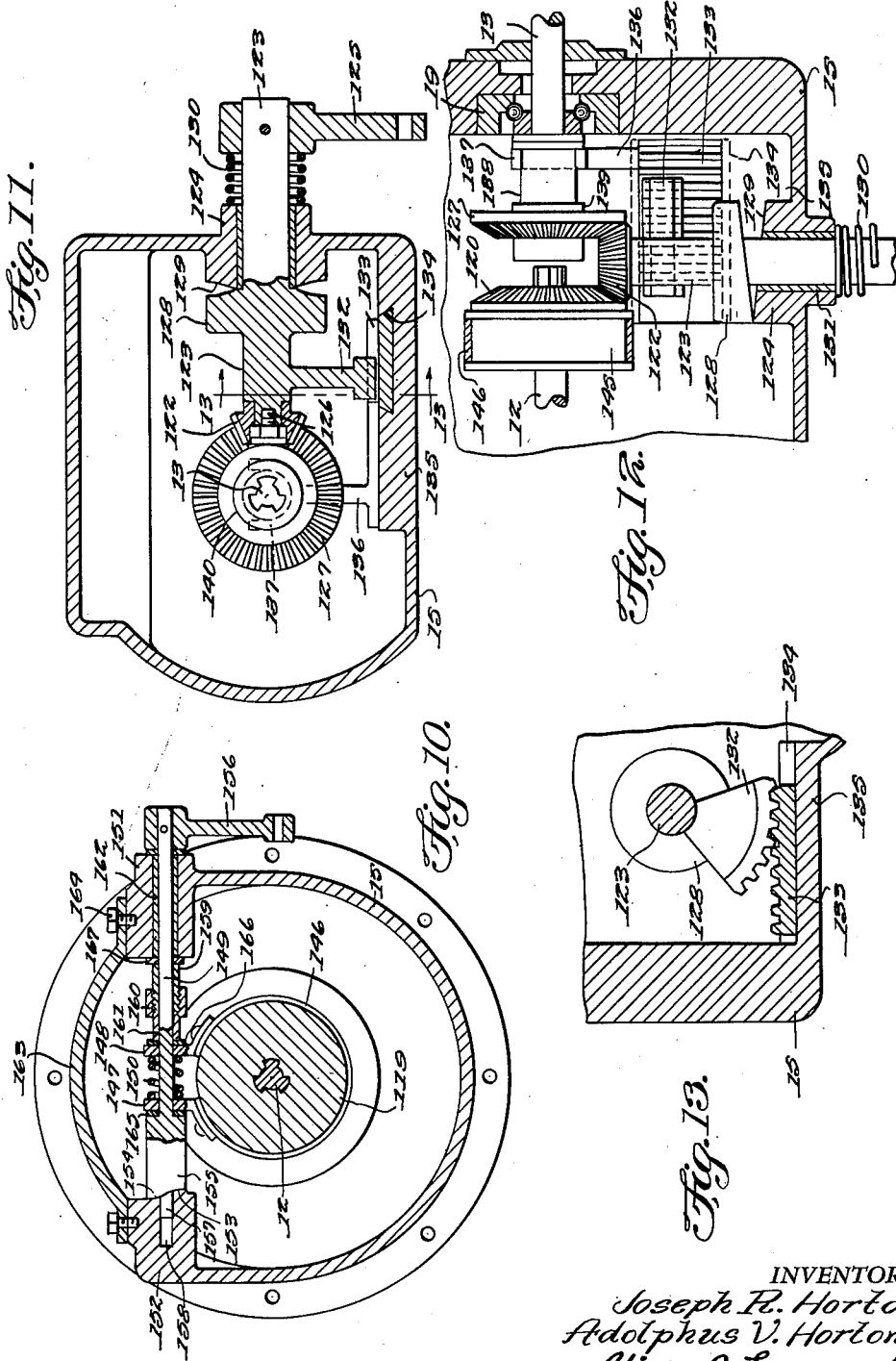

March 22, 1955  J. R. HORTON ET AL  2,704,468
POWER TRANSMISSION
Filed Feb. 27, 1951  6 Sheets-Sheet 5

INVENTOR.
Joseph R. Horton,
Adolphus V. Horton,
BY Victor J. Evans & Co.
ATTORNEYS

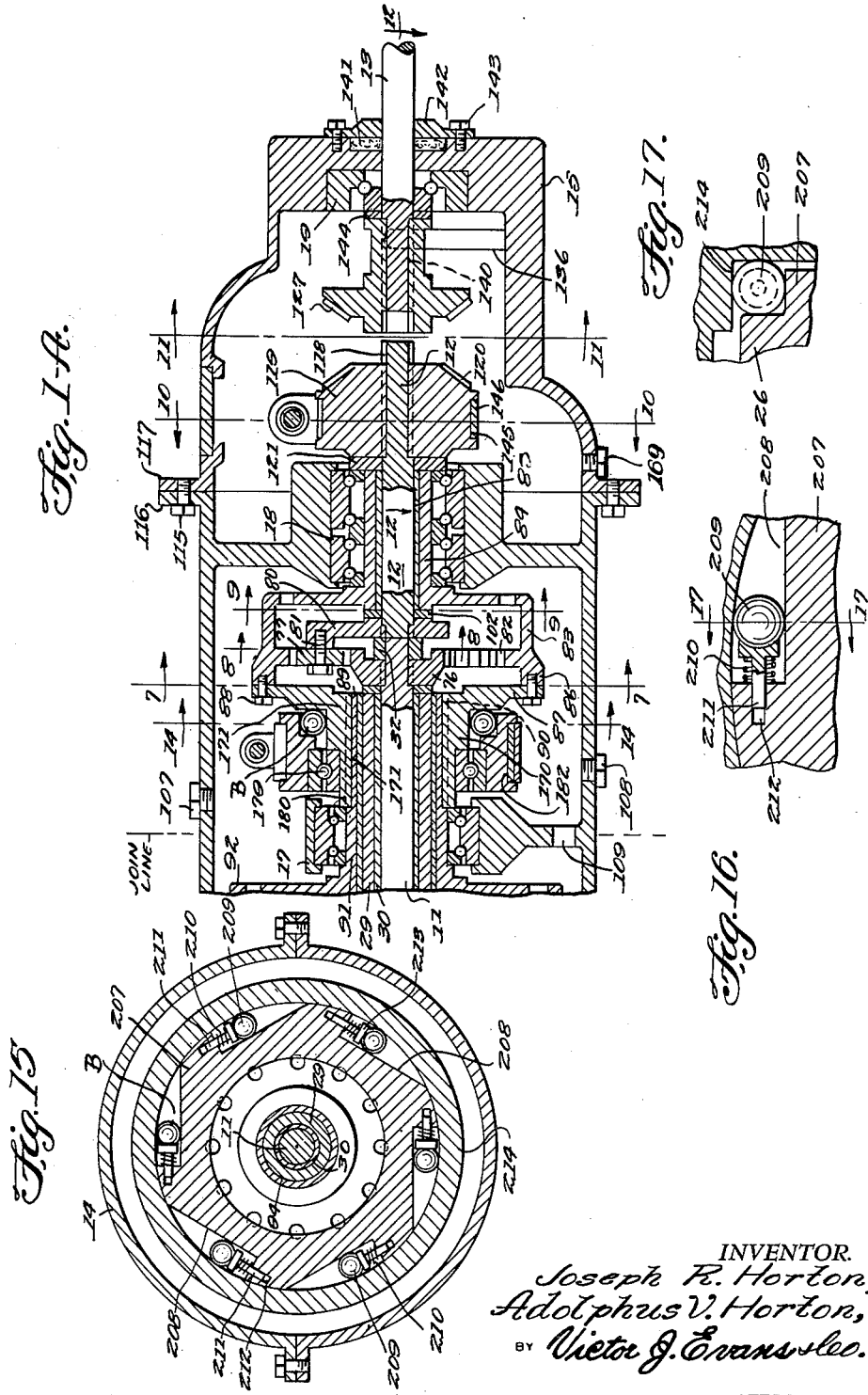

United States Patent Office 2,704,468
Patented Mar. 22, 1955

2,704,468

POWER TRANSMISSION

Joseph Rex Horton and Adolphus V. Horton, Knoxville, Tenn.

Application February 27, 1951, Serial No. 212,938

9 Claims. (Cl. 74—688)

This invention relates to a transmission of the automatic type in which a high starting torque is required and in which the high torque multiplication factor is substantially reduced as the load requirements change, eventually reaching a one to one ratio, or unity factor.

The purpose of this invention is to provide an automatic transmission in which planetary or orbit gears thereof are free to revolve in a negative direction, remain stationary, and turn forward at a speed below engine speed or turn forward at the engine speed dependant upon the balance between a force generated between the driving and driven members of the control unit and the force required to move the load.

Various types of automatic transmissions have been provided, some of which use a plurality of pumps which require a plurality of valves, others using pumps in combination with brake bands for holding the parts progressively and others using arrangements of differential gearing and in this type of transmission a driving force is transmitted to an operating gear by a toroidal member through an intermediate member. In the most common devices of this type the driving elements drive hydro-kinetically and they oppose the counter-torque hydro-kinetically and it is conventional in devices of this type to use only one toroidal assembly so that it is difficult to obtain smooth operation. With this thought in mind this invention contemplates an automatic transmission using two planetary gear assemblies in series, one of which is telescoped over the other in such manner that the counter-torque of both assemblies is reflected directly back to the source.

The object of this invention is, therefore, to provide an automatic transmission in which one torque drum and tube assembly telescope over another whereby the great torque spread necessary for automotive use is obtained.

Another object of the invention is to provide an automatic transmission having two planetary gear assemblies mounted in series whereby the torque multiplying effect of one assembly is multiplied by the effect of the other.

Another object of the invention is to provide a transmission that will have a variable torque multiplication factor which is changed in operation so as to suit the load requirements from time to time without attention from the operator.

Another object of the invention is to provide a power transmission in which the torque multiplication factor may be changed during operation without a break in the flow of power from the engine to the load.

A further object of the invention is to provide such a transmission that will have a variable torque multiplication factor, this factor being changed in operation in such manner as to suit the load requirements from time to time, without attention from the operator.

A still further object of the invention is to provide such a power transmission in which the torque multiplication factor may be changed during operation without a break in the flow of power from the engine to the load.

A further object of the invention is to provide an automatic transmission using a plurality of planetary gear assemblies connected in series and in which one telescopes over the other in such a manner that the counter-torque of both assemblies is reflected back to the power source, and which is of a comparatively simple and economical construction.

With these and other objects and advantages in view the invention embodies an automatic transmission having a plurality of planetary gear assemblies mounted in series and with one telescoping over the other, a sectional shaft journaled in a housing with the planetary gear assemblies and suitable clutch and brake elements through which the parts are progressively actuated.

Other features and advantages of the invention will appear from the following description taken in connection with the drawings wherein:

Figure 1 is a longitudinal section through the driving end of the automatic transmission.

Figure 1–A is a similar section through the driven end of the transmission.

Figure 2 is a cross section through the end clutch members at the driving end of the transmission taken on line 2—2 of Figure 1.

Figure 3 is a cross section taken on line 3—3 of Figure 1 showing the splines between the hub of one of the driven members at the driving end of the transmission.

Figure 4 is a cross section taken on line 4—4 of Figure 1 showing one of the bearing elements with the tubular shaft journaled in the bearing element.

Figure 5 is a cross section through the transmission taken on line 5—5 of Figure 1 showing the first planetary gear assembly.

Figure 6 is a cross section through the bearing mounting between the planetary gear assemblies.

Figure 7 is a cross section taken on line 7—7 of Figure 1–A illustrating the second planetary gear assembly.

Figure 8 is a similar section with parts omitted showing the mounting element of the planetary gear assembly.

Figure 9 is a cross section taken on line 9—9 of Figure 1–A showing the housing surrounding the second planetary gear assembly.

Figure 10 is a cross section taken on line 10—10 of Figure 1–A showing the brake for holding the end of the driving shaft of the transmission.

Figure 11 is a cross section taken on line 11—11 of Figure 1–A showing the mounting of the reversing gear assembly.

Figure 12 is a sectional plan taken on line 12—12 of Figure 1–A showing a plan view through the reversing gear assembly.

Figure 13 is a detail taken on line 13—13 of Figure 11 showing a segment for disengaging the driven end of the shaft of the transmission from the end of the driving shaft.

Figure 15 is a similar section taken on line 15—15 of Figure 1 showing a second overrunning clutch used in combination with the first planetary gear assembly.

Figure 16 is a detail showing one of the spring actuated ball mountings of the overrunning clutch.

Figure 17 is a section taken on line 17—17 of Figure 16 showing a detail of the overrunning clutch as shown in Figure 1.

Figure 1:
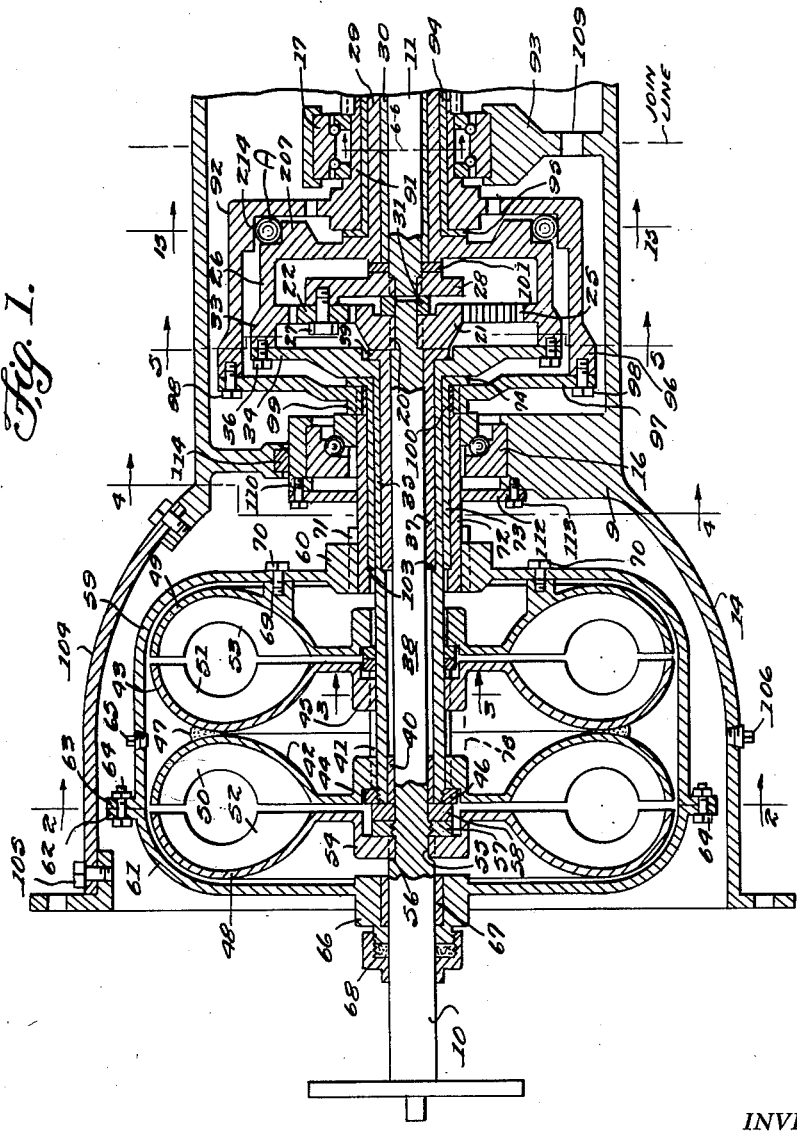

Referring now to the drawings wherein like reference characters denote corresponding parts the improved transmission of this invention includes a driving shaft 10, intermediate driven shafts 11 and 12, a driven shaft 13, a main housing 14, an end housing section 15 and bearings 16, 17, 18 and 19 by which the sections of the shafts are journaled in the housing.

The outer end of the driving shaft 10 is connected to an engine crank shaft or to any suitable power means and the inner end is provided with splines 20 on which a center or sun gear 21 is mounted with a pressed fit and the gear 21 meshes with the intermediate gears 22, 23 and 24 of the planetary gear assembly as shown in Figure 5 in which the intermediate gears mesh with a gear 25 forming an orbit or ring gear which is carried by the inner drum housing 26. The intermediate gears are journaled by suitable stubs 27 on a spider 28 that is splined on the shaft 11 and the drum 26 is journaled in the bearing 17 through a sleeve 29 in which the shaft 11 is rotatably mounted through a bushing 30.

A thrust bearing 31 is provided on the end of the shaft 10 between the gear 21 and spider 28 and a similar thrust bearing 32 is provided on the end of the shaft 11.

The drum 26 is provided with a flange 33 on which a cover plate 34 having an extended sleeve 35 is mounted by bolts 36 and the sleeve 35 extends over a bushing 37 on a section 38 of the shaft 10, which is of reduced diameter. The end of the bushing 37 is provided with a flange 39 that engages the gear 21. The outer end of the sleeve 35, which forms a torque tube is journaled on the section 38 of the shaft through the bearing sleeve 40. The sleeve or torque tube 35 is free to rotate on the section 38 of the shaft. The bushing 37 and bearing sleeve 40 may be formed of bronze or other suitable bearing metal and the flange 39 provides a thrust collar retaining the cover plate 34 and the gear 21 in spaced relation.

The forward end of the torque tube or sleeve 35 is enlarged and provided with splines 41 and intermediate or second driving means or members 42 and a driving impeller 43, which are provided with hubs 44 and 45, respectively, are splined to correspond with the splines 41 whereby these members are mounted on the sleeve 35 and secured in position by a spline nut 46. With the members 42 and 43 mounted in this manner they revolve as a unit and are preferably secured together by welding as indicated at the point 47. These members 42 and 43 are mounted as a unit, between the driving member or impeller 48 and driven means 49.

The inner faces of the members 42 and 43 are provided with vanes 50 and 51, respectively and similar vanes 52 and 53 are provided on the inner faces of the driving and driven elements 48 and 49, respectively.

The driving member 48 is provided with a hub 54 that is splined to the driving shaft 10 by splines 55 and the hub is rigidly held against a shoulder 56 by a nut 57 that is threaded on the shaft 10. A spacer 58 is positioned between the nuts 46 and 57, as shown in Figure 1.

The members 42 and 43, and 48 and 49 provide a hydrokinetic coupling unit and these elements are enclosed in a housing 59 having a hub 60 on the inner end and having a cover plate 61 bolted through a flange 62 of the cover plate to a flange 63 of the housing by bolts 64. The housing is provided with an oil filling plug 65 and the cover 61 is journaled on the driving shaft 10 through a hub 66 having a bearing sleeve 67 therein and having a packing gland 68 on the outer end.

The driven member 49 of the second part of the hydrokinetic coupling unit is bolted to the housing 59 through a ring 69 with bolts 70, with the member 43 providing the driving member of the unit. The housing 59 is connected by splines 71 to an outer torque tube 72 which is journaled in the bearing 16 and rotatably mounted on the inner torque tube or sleeve 35 through a bushing 73 having a thrust flange 74 on the end which is positioned between the ends of the outer torque tube 72 and hub of the cover plate 34 of the drum 26.

The housing 59 and cover 61 provide a complete sealed unit and this unit is filled with a suitable hydraulic coupling fluid approximately to a level indicated at 75.

With the parts arranged in this manner the driving shaft 10 with the driving member 48 rotate together as a unit with the inner torque tube 35 and intermediate members 42 and 43 turning together as a unit and with the outer torque tube 72 and driven member 49 with its associated housing 59 and the cover 61 thereof rotating as a unit.

The forward end of the intermediate driven shaft section 11, being splined and pressed firmly into the spider 28 is rotated by the planetary gear unit and the opposite end of the shaft section 11 is splined to receive the second sun gear 76 of a second planetary gear unit having gears 77, 78 and 79 mounted on a second spider 80 by studs 81 and also meshing with a second ring or orbit gear 82 of a drum 83 which is journaled by an extended hub 84 in the bearing 18 with a bushing 85 in the hub and in which hub the intermediate driven shaft section 12 is rotatably mounted.

The drum 83 is provided with an annular rim 86 and a disc 87 is attached to the rim by bolts 88. The disc 87 is provided with a centrally disposed splined opening 89 by which it is mounted, with a pressed fit on splines 90 on the end of an extended hub 91 of an outer drum 92 positioned over the drum 26. The drum 92 is journaled through the hub 91 in the bearing 17 in a web 93 in the intermediate part of the housing and a bushing 94 having a flange 95 on the end is positioned between the hub 91 and sleeve 29 of the drum 26.

Figure 14:
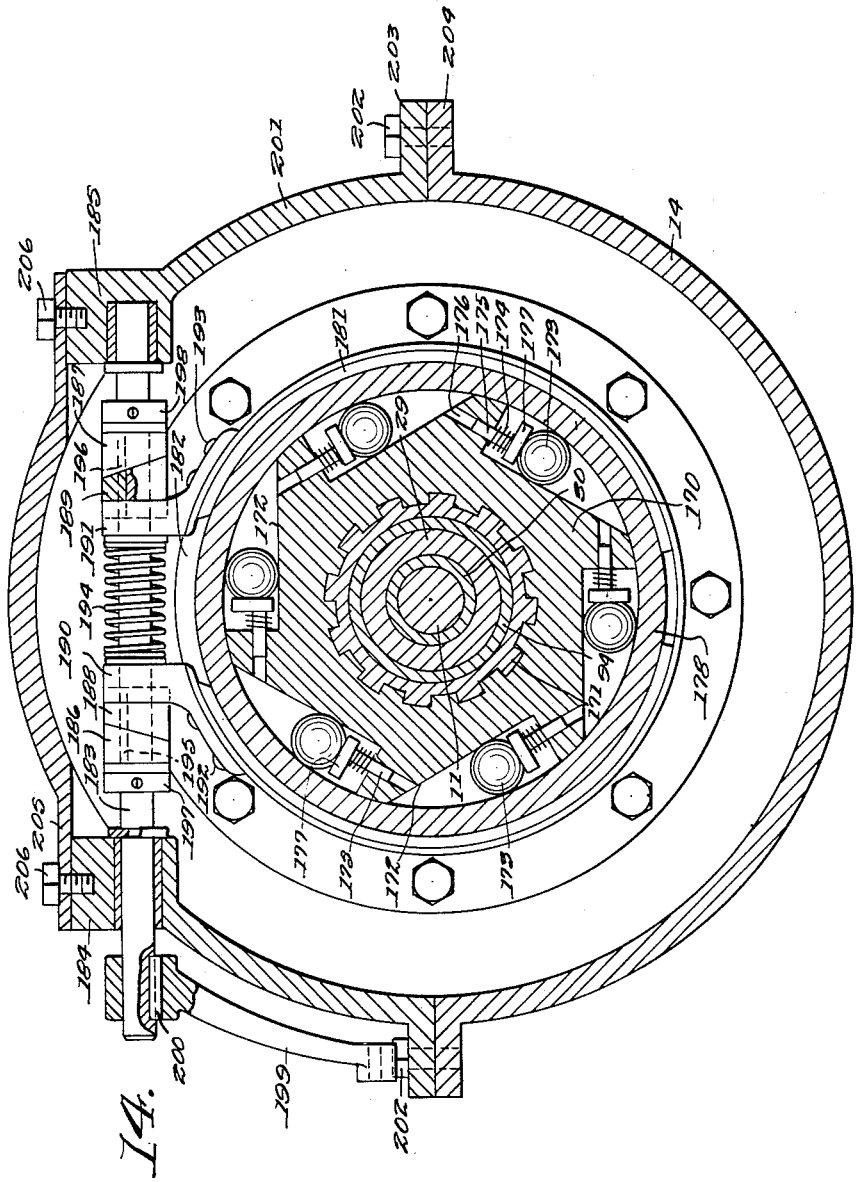
Figure 14 is a cross section through the transmission taken on line 14—14 of Figure 1–A, illustrating an overrunning clutch and brake combination.

The disc 87 is also provided with an extended hub 170 which is substantially hexagonal in shape and the opening 89 which extends through the hub is splined to the sleeve 91 by splines 171 and, as illustrated in Figure 14 the hub 170 is provided with pockets or recesses 172 in which balls 173 are positioned. The balls are resiliently held by springs 174 on pins 175, which are slidably mounted in openings 176 and the outer ends of which are provided with discs 177 that engage the balls.

The springs urge the balls into gripping relation with the inner surfaces of the recesses 172 and the inner wall of the overrunning clutch collar 178 which is journaled by the ball bearing 179 on an extended end 180 of the hub 170. By this means the hub 170 is free to rotate in a clockwise direction without carrying the clutch collar 178 and upon rotation of the hub in a counter-clockwise direction the balls grip the clutch collar so that the collar is carried with the hub until it is held by a brake band 181 which is positioned in a slot 182 in the collar 178 and actuated by a bolt 183 which is journaled in bearings 184 and 185 of the intermediate section of the housing.

The bolt 183 is provided with cams 186 and 187 that coact with similar cams 188 and 189, respectively which are fixedly mounted on lugs 190 and 191 that are secured to the ends of the brake bands by rivets 192 and 193, respectively. The lugs are urged apart by a spring 194 and the cams are keyed to the bolts 183 by keys 195 and 196, respectively. The cams are secured in position on the bolt by set collars 197 and 198 and the bolt is actuated by an arm 199 which is secured to the outer end of the bolt by a key 200. The section 14 of the housing is provided with an upper section 201 that is secured to the section 14 by bolts 202 and flanges 203 and 204 and the section 201 is provided with a cover plate 205 that is secured to the upper edge of the section 201 by bolts 206.

With the parts arranged in this manner the arm 199 which may be connected to and actuated by a foot or hand lever is actuated to clamp the brake band on the collar or drum 178 to hold the drum stationary and when the brake drum is held stationary the torque drums 83 and 92 are held against rotation in a direction opposite to the rotation of the engine, although they are free to rotate either independently or in combination, in the direction of rotation of the engine.

The torque drums 83 and 92 are directly connected to the fluid drive member 49, respectively and when the brake drum is held stationary this fluid drive member is held against rotation in a negative direction, but is free to rotate with the engine as load requirements permit.

The flange 95 provides a thrust bearing between the drums 26 and 92.

The drum 92 is provided with a ring 96 to which a disc 97 is attached by bolts 98 and the disc is provided with a splined hub 99 that is secured to the splined end 100 of the outer torque tube 72.

This completes the connections between the housing 59, the driving shaft and the planetary gears and a thrust collar 101 is provided between the end of the spider 28 and the shaft 11 and a similar thrust bearing 102 is provided between the spider 80 and the drum 83. Suitable oil seals 103 are provided between the driving shaft 10 and the inner torque tube 35.

The driving end of the housing 14 is provided with an inspection plate 104 which is secured to the housing by bolts 105, thereby providing access to the filling plug 65, and in the lower part of the housing a drain plug 106 is provided. A suitable oil filter plug 107 may be provided in the intermediate part of the housing 14 and a drain plug 108 is also provided in this section of the housing, the web 93 being provided with an opening 109 to facilitate draining the lower part of the housing.

The bearing 16 is mounted in an intermediate web 9 with a cap 110 secured to the web by bolts 111 and the bearing pocket is sealed by a disc 112 that is secured to the cap and web by bolts 113. An oil seal 114 is provided above the cap 110. These seals are provided to prevent lubricants from the planetary gear section working into the housing 59 in which the hydro-kinetic control unit is positioned.

An overrunning clutch is also provided between the inner drum housing 26 and the outer drum 92, as illustrated in Figure 15 wherein a hexagonally shaped rim 207, extended from the face of the inner drum housing 26 is provided with recesses 208 and spring actuated balls 209, positioned in the recesses permit rotation of the inner drum housing 26 in the outer housing 92 in a clockwise direction and prevent rotation thereof in a counter-clockwise direction in relation to the outer drum.

The balls 209 are held by springs 210 on pins 211, the pins being slidably mounted in openings 212 in rim 207 and the outer ends thereof being provided with heads 213 that engage the balls. As illustrated in Figure 1 the balls are positioned to engage an inner ring surface 214 in the outer housing 92.

The reverse and neutral section of the transmission is positioned in the end section 15 of the housing which is secured to the intermediate section by bolts 115 that are positioned in flanges 116 and 117.

The intermediate section 12 of the driven shaft on which the hub 84 is positioned and which is journaled in the bearings 18, is provided with a splined end 118 on which the brake drum 119 and a bevel gear 120 are secured by splines therein. A thrust collar 121 is positioned between the hub of the brake drum and the end of the extended hub 84 of the drum 83.

The bevel gear 120 meshes with a pinion 122 on the shaft 123 that is journaled in a bearing 124 in the end section 15 of the housing and the shaft is actuated by a lever 125 on the outer end to move the pinion 122 which is freely journaled on a stud 126 on the end of the shaft 123 into or out of engagement with the bevel gears 120 and 127. Upon rotation of the shaft 123 a cam 128 on the shaft engages a cam surface 129 on the inner end of the bearing 124 to slide the shaft with the pinion 122 inwardly or outwardly. The shaft is urged outwardly by a spring 130 and the bearing 124 is provided with a bushing 131.

The shaft 123 is also provided with a gear segment 132 that meshes with a rack 133 slidably mounted in a slot 134 in the base 135 of the end section 15 of the housing and as the shaft 123 is rotated the rack 133 slides in the slot 134. The width of the rack 133 is greater than that of the segment 132 to compensate for outward movement of the segment as the shaft 123 moves outwardly to disengage the pinion 122 from the gear 120.

The rack 133 is provided with an arm 136 having a yoke 137 on the outer end and the arms of the yoke extend upwardly over a cylindrical section 138 of a hub 139 of the gear 127 which is splined on the inner end of the driven shaft 13 by splines 140 as shown in Figure 1.

The shaft 13 is journaled in the bearing 19 and an oil seal 141 in the end of the housing is protected by a cover plate 142 which is secured to the end of the housing by bolts 143. A thrust collar 144 is provided between the end of the hub 139 of the gear 127 and the bearing 19.

The brake drum 119 is provided with a groove 145 in which a brake band 146 is positioned as shown in Figure 10 and the ends of the band 146 are provided with flanges 147 and 148 that are positioned on a shaft 149, the flanges being held in spaced relation by a spring 150.

The shaft 149 is journaled in a bearing 151 at one side of the housing and also in the bearing 152 at the opposite side and the face of the bearing 152 is formed with a cam surface 153 that coacts with a similar surface 154 on a hub 155 of the shaft 149 and as the shaft 149 is rotated by a crank arm 156 the cam surfaces 153 and 154 slide the shaft longitudinally urging the flange 147 toward the flange 148 whereby the drum 119 is held stationary. The shaft 149 is provided with an extended end 157 that extends into an opening 158 in the bearing 152 and the flange 148 on the end of the brake band 146 is held in position by a sleeve 159 that is threaded into a hub or nut 160 on a sleeve 161 and with the sleeves positioned between the flange 148 and the inner end of the bearing 151 the position of the flange 148 may readily be adjusted by turning the nut. The bearing 151 is provided with a bushing 162 and a cap 163 is secured over an opening in the upper part of the housing by bolts 164. Spacing washers 165, 166 and 167 are provided on the shaft 149 to facilitate adjusting the elements thereon. This section of the housing may be provided with a suitable filling plug and a drain plug 169 is provided in the lower part.

With the parts in the position as illustrated and as particularly shown in Figure 12 the transmission is in reverse gear and with a forward movement of the lever 125 the pinion 122 will be withdrawn from meshing engagement with the gears 120 and 127 and during this movement the segment 132 moves the rack 133 forwardly sliding the gear 127 into engagement with the splines 118 on the rear end of the intermediate section 12 of the driven shaft. In this movement and before the yoke 137 of the rack 133 engages the rearward end 139 of the hub of the gear 127 the transmission is in neutral, and with continued movement of the shaft 123 by the lever 125 the yoke 137 presses gear 127 forward on shaft 12, causing it to abut gear 120 and by means of splines 118, places the transmission in forward gear.

It will be noted that members 42 and 43 revolve as a single unit, since they are mounted on the same splined section of inner torque tube 35, and that they are interposed as a unit between driving member 48 and driven member 49.

The inner faces 50, 51, 52 and 53 of members 42, 43, 48 and 49 respectively, are similar in appearance and construction, as can be seen from Figure 1. They are of the type commonly used in hydro-kinetic coupling units, except that they may be smaller in diameter for a given engine installation due to the mechanical advantages given them in the gear arrangement used. Member 48 is called the driving member, since it is splined and pressed onto driving shaft 10 and turns integrally with it. Since it faces member 42, it can be seen that these two members form a complete hydro-kinetic coupling unit. Driven member 49 is bolted onto housing 59, which is splined and pressed onto outer torque tube 72 and faces intermediate driven member 43, thus forming a second hydro-kinetic coupling unit, with member 43 being the driving half. Thus member 42 is the driven member of the first coupling unit, while member 43 is the driving member of the second coupling unit.

Housing member 59 is semi-spherical in shape and bolts onto front housing member 61 in such manner as to form an oil-tight enclosure for members 42, 43, 48 and 49. This enclosure is filled to the desired level with suitable hydraulic coupling fluid, the exact level being determined by the degree of coupling desired. Front housing member 61 is free to turn on drive shaft 10 by means of bushing 67. Oil packing nut 68 is screwed onto the threaded hub of housing member 61, thus forming an oil-tight seal.

From the foregoing it can be seen that driving shaft 10 and driving member 48 turn together as a unit; inner torque tube 35 and intermediate members 42 and 43 turn together as a unit, while outer torque tube 72, driven member 49 and its associated housing members 59 and 61 turn together as a unit.

From the foregoing it will be understood that the transmission is comprised of three sections: the control section, which is housed by the bell-like section 104 of the housing, the planetary gear section, which is enclosed by the cylindrical part 14 of the housing and the reverse-neutral section, which is enclosed by housing 15. The control section is filled with suitable hydraulic coupling fluid to the desired level, while the gear section is filled to the level of the filler plug 107, for lubrication purposes only.

The driving shaft 10 which is coupled to the engine carries with it the driving member 48. The action of this member is to force oil outward into the outer periphery of the housing formed by housing members 59 and 61, thus causing driven members 42 and 43 to rotate, due to the impartation of kinetic energy at the outer periphery of members 48 and 42. Driven member 43 also becomes the driving member for member 49 so that the entire assembly tends to rotate as a unit at speeds above engine idling speed.

Driving shaft 10 is also connected to gear 21, which is the inner gear of the first planetary gear assembly. It can be seen that the outer gear of this assembly is connected by means of drum 26, disc 34 and inner torque tube 35 to intermediate driven members 42 and 43.

It can further be seen that intermediate driven shaft 11, which is caused to rotate by the action of revolving member 28, is directly connected to inner gear 76. This gear is the inner member of the second planetary gear system, the outer gear of which is connected by means of drum 83, disc 88, drum 92, disc 97 and outer torque tube 72 to driven member 49. Driven shaft 12 is driven by revolving member 80.

Summarizing, the coupling between driving shaft 10 and intermediate driven shaft 11 is formed by inner gear 21, gears 22, 23 and 24, outer gear 25 and revolving member 26, with the counter-torque of the load being absorbed by the over-running clutch A formed by the balls 209 between the inclined surfaces 208, of the member 207 and member 214, as shown in Figure 15, between drum 26 and drum 92 and thus through the second over-running clutch B formed by the balls 173 between the inclined surfaces 172 of the member 170, and the member 178, as shown in Figure 14, into the housing, while in intermediate gear, this counter-torque being picked up directly by the engine as driven members 42 and 43 release the first over-running clutch by rotating drum 26 forward with the engine.

Summarizing further, the coupling between intermediate driven shaft 11 and driven shaft 12 is formed by inner gear 76, intermediate gears 77, 78 and 79, outer gear 82 and revolving member 80, with the counter-torque of the load being absorbed by the over-running clutch B interposed between disc 88 and brake drum 178, and thereby to the housing. This counter-torque is picked up directly by the engine when final driven member 49 releases the second over-running clutch A by beginning to rotate in the direction of the engine.

While the arrangement of the two planetary gear assemblies and their respective counter-torque assemblies is such that the entire assembly rotates as a unit at high speeds and under low torque requirement conditions, it can be seen that an increase in the load on driven shaft 12 will cause torque drum 83 to fall below engine speed, causing a corresponding decrease in the speed of driven shaft 12. This allows engine speed to increase with respect to driven shaft 12, but torque multiplication does not take place until drum 83 is brought to a stand-still and all counter-torque is absorbed by the housing through the action of the over-running clutch B encased by the brake drum 178. During operation, drum 178 is held by band 181 through lever 199, which is engaged by a ratchet held, manually operated lever, not shown.

When drum 83 is held by counter-torque against the housing as described, the torque multiplication of the transmission is determined by the gear ratios in the second planetary gear assembly including the gears 76, 77 and 82, and the transmission is in intermediate, or second, gear.

When the torque multiplication secured by operation in second gear is not sufficient to keep driven shaft 12 revolving, reflected counter-torque causes a decrease in the speed of inner torque drum 26. This causes a decrease in the speed of intermediate shaft 11, allowing a further increase in engine speed in relation to driven shaft 12. When inner drum 26 is brought to a stand-still by counter-torque, it can revolve in a direction counter to the engine due to the action of its over-running clutch A against outer drums 92 and 83, which have already been braked to a stand-still by the original increase in load.

At this point practically all counter-torque is carried to the housing through the two over-running clutches A and B and the torque multiplication of the transmission is the product of the ratios of the two planetary gear assemblies. The transmission is thus in low gear at this point.

It should be borne in mind that fluid drive member 49 is braked to a stand-still along with torque drum 83, while fluid drive members 42 and 43 are braked to a stand-still along with torque drum 26. Thus hydro-kinetic coupling between these units and fluid drive member 48 tends to reflect the counter-torque of the load directly against the engine, but the counter-torque thus reflected is kept down to the desired level by proper selection of the diameter of the units, together with the level of the fluid in them. This coupling action can be so selected that most of the counter-torque is absorbed by the housing at reasonable low engine speeds.

In a review of the operation of the transmission from a standing start to a 1–1 ratio, it should be noted that recommended operation of the unit is with a standard type clutch, controlled by a vacuum operated piston, neither of which is a part of this invention. A further point to note is that brake drum 178 is held by band 181 during all normal operations.

While the above mentioned conditions obtain when the engine is allowed to idle, the engine is disengaged and there is no movement of parts in the transmission. A depression of the throttle causes the conventional clutch of the engine to engage and driving shaft 10 begins to revolve, carrying with it driving member 48. Since the coupling between driving member 48 and driven members 42 and 43 and driven member 49 is negligible at this low speed, most of the counter-torque from the load is absorbed by torque drums 26 and 83, through the action of their respective over-running clutches, and thus carried to the frame. Since neither torque drum can revolve in a negative direction, the movement of driving shaft 10 is thus transmitted to driven shaft 12 through the two planetary gear assemblies.

As the speed of driven shaft 12 increases and the torque requirements are lowered, the increase in speed differential between driving member 48 and driven member 42 causes an increase in the hydro-kinetic coupling between these units, thus causing more of the counter-torque of the load to be reflected directly into the engine. As driven member 42 begins to revolve, the over-running clutch A between inner drum 26 and outer drum 92 allows drum 26 and its associated fluid driving members 42 and 43 to approach engine speed, thus placing the transmission in second gear.

As the torque requirements of shaft 12 are still further lowered, the engine speed increases, resulting in an increase in the speed of fluid drive members 42 and 43. This increase in the speed of member 43 results in greater hydro-kinetic coupling between it and final driven member 49, thus reflecting more of the counter-torque of the load into the engine. At this point the over-running clutch between drum 83 and the frame is released and drum 83 rotates in the direction of the engine. As this drum attains engine speed the entire assembly rotates as a unit on bearings 16, 17, 18 and 19, and the transmission is in high.

Attention should be called to the fact that brake drum 178 rotates on ball bearing 179 only when band 181 is released and the engine is rotating at speeds above idling. With certain types of stationary installations where smooth starting is not essential, the vacuum operated clutch may be left out entirely. In such installations, brake drum 178 and band 181 operate as a starting clutch, being operated either manually or by other suitable means. When used in this way, both counter-torque assemblies rotate in a negative direction while the transmission is in neutral. The unit is placed in gear by simply stopping the negative rotation of brake drum 178 by band 181. As long as it remains in operation, there is a complete balance between engine speed on the one hand and load torque requirements on the other hand.

It will be understood that modifications may be made in the design and arrangement of the parts without departing from the spirit of the invention.

What is claimed is:

1. A transmission unit comprising a controlling section, a planetary gear section, and a neutral section, a driving shaft extended through the control section, a driving impeller positioned in said control section and mounted on said driving shaft, a center gear carried by an end of the driving shaft extended into the said planetary gear section, an inner drum having a ring gear therein journaled in said planetary gear section and positioned over the said center gear, an intermediate driven shaft journaled in said planetary gear section, a spider carried by the intermediate driven shaft, intermediate gears journaled on the spider and positioned in meshing relation with the center and ring gears, a driven impeller in the control section positioned to coact with the driving impeller and journaled through a torque tube on the driving shaft, means connecting the torque tube to the said inner drum, an impeller housing journaled on the driving shaft and positioned over said impellers, an impeller mounted in the impeller housing and positioned to coact with said driven impeller, an outer drum positioned around and journaled on said inner drum, an outer torque shaft positioned around said inner torque shaft for connecting said impeller housing to the outer drum, a driven shaft journaled in the neutral section of the housing, a planetary gear assembly connecting the driven shaft to the outer drum of the planetary gear section, and means connecting the driven shaft to the said intermediate driven shaft.

2. A transmission unit comprising a controlling section, a planetary gear section, and a neutral section, a driving shaft extended through the control section, a driving impeller positioned in said control section and mounted on said driving shaft, a center gear carried by an end of the driving shaft extended into the said planetary gear section, an inner drum having a ring gear therein journaled in said planetary gear section and positioned over the said center gear, an intermediate driven shaft journaled in said planetary gear section, a spider carried by the intermediate driven shaft, intermediate gears journaled on the spider and positioned in meshing relation with the center and ring gears, a driven impeller in the control section positioned to coact with the driving impeller and journaled through a torque tube on the driving shaft, means connecting the torque tube to the said inner drum, an impeller housing journaled on the driving shaft and positioned over said impellers, an impeller mounted in the impeller housing and positioned to coact with said driven impeller, an outer drum positioned around and journaled on said inner drum, an outer torque shaft positioned around said inner torque shaft for connecting said impeller housing to the outer drum, a driven shaft journaled in the neutral section of the housing, and a planetary gear assembly connecting the driven shaft to the outer drum of the planetary gear section.

3. A transmission unit comprising a controlling section, a planetary gear section, and a neutral section, a driving shaft extended through the control section, a driving impeller positioned in said control section and mounted on said driving shaft, a center gear carried by an end of the driving shaft extended into the said planetary gear section, an inner drum having a ring gear therein journaled in said planetary gear section and positioned over the said center gear, an intermediate driven shaft journaled in said planetary gear section, a spider carried by the intermediate driven shaft, intermediate gears journaled on the spider and positioned in meshing relation with the center and ring gears, a driven impeller in the control section positioned to coact with the driving impeller and journaled through a torque tube on the driving shaft, means connecting the torque tube to the said inner drum, an impeller housing journaled on the driving shaft and positioned over said impellers, an impeller mounted in the impeller housing and positioned to coact with said driven impeller, an outer drum positioned around and journaled on said inner drum, an outer torque shaft positioned around said inner torque shaft for connecting said impeller housing to the outer drum, a driven shaft journaled in the neutral section of the housing, and a planetary gear assembly connecting the driven shaft to the outer drum of the planetary gear section.

4. In a transmission unit, the combination which comprises a control section, a planetary gear section, and a neutral section, a driving shaft extended through the control section, a driving impeller positioned in said control section and mounted on said driving shaft, a center gear carried by an end of the driving shaft extended into the planetary gear section, a drum having a ring gear therein journaled in said planetary gear section and positioned over the said center gear, a first driven shaft section journaled in said planetary gear section, a spider carried by the first driven shaft section, intermediate gears journaled on the spider and positioned in meshing relation with the center and ring gears, an intermediate driven impeller in the control section positioned to coact with the driving impeller and journaled through a torque tube on the said driving shaft, means connecting the torque tube to the said drum, a second driven shaft section also journaled in the planetary gear section of the housing, a spider carried by the second driven shaft section, a drum having a ring gear therein journaled in said planetary gear section and positioned over the said spider of the second driven shaft section, a center gear carried by the end of said first driven shaft section positioned to coact with the spider of the second driven shaft section, intermediate gears journaled on the spider of the second driven shaft section positioned to coact with the cetner gear of the first driven shaft section and ring gear of the drum positioned over the spider of the second driven shaft section, a drum positioned over the drum positioned over the center gear and spider of the driving shaft and first driven shaft section, respectively, a housing journaled on the driving shaft and positioned over the said impellers, an impeller in the housing positioned to coact with the intermediate impellers, a torque tube connecting the housing through the said drum positioned over the drum of the center gear and spider of the driving shaft and first driven shaft section, means connecting the drum over the drum of the center gear and spider of the driving shaft and first driven shaft section to the drum positioned over the center gear and spider of the first driven shaft section and second driven shaft section, respectively, said second driven shaft section having a splined end extended into the said neutral section, a driven shaft journaled in the said neutral section, and means directly driving the said driven shaft by the said second driven shaft section.

5. A transmission unit comprising a controlling section, a planetary gear section, and a neutral section, a driving shaft extended through the control section, a driving impeller positioned in said control section and mounted on said driving shaft, a center gear carried by an end of the driving shaft extended into the said planetary gear section, a drum having a ring gear therein journaled in said planetary gear section and positioned over the said center gear, a driven shaft section journaled in said planetary gear section, a spider carried by the driven shaft, intermediate gears journaled on the spider and positioned in meshing relation with the center and ring gears, an over-running clutch positioned on the said drum and mounted to coact with the driven shaft and positioned to permit rotation of the driven shaft in the same direction of rotation as that of the driving shaft and preventing rotation of the driven shaft in the opposite direction, a driven impeller in the control section positioned to coact with the driving impeller and journaled through a torque tube on the driving shaft, means connecting the torque tube to the said drum, a driven shaft journaled in the neutral section of the housing, and means directly connecting the driven shaft to the driven shaft section in the planetary gear section.

6. In a transmission unit, the combination which comprises a control section, a planetary gear section, and a neutral section, a driving shaft extended through the control section, an over-running clutch in the said first planetary gear section positioned between the drum thereof and an outer drum positioned over the drum of the planetary gear section, an over-running clutch positioned to coact with the second planetary gear section, a brake mounted in the housing and positioned to hold the collar surrounding the said over-running clutch of the second planetary gear section, a driving impeller positioned in said control section and mounted on said driving shaft, a center gear carried by an end of the driving shaft extended into the planetary gear section, a drum having a ring gear therein journaled in said planetary gear section and positioned over the said center gear, a first driven shaft section journaled in said planetary gear section, a spider carried by the first driven shaft section, intermediate gears journaled on the spider and positioned in meshing relation with the center and ring gears, an intermediate driven impeller in the control section positioned to coact with the driving impeller and journaled through a torque tube on the said driving shaft, means connecting the torque tube to the said drum, a second driven shaft section also journaled in planetary gear section of the housing, a spider carried by the second driven shaft section, a drum having a ring gear therein journaled in said planetary gear section and positioned over the said spider of the second driven shaft section, a center gear carried by the end of said first driven shaft section positioned to coact with the spider of the second driven shaft section, intermediate gears journaled on the spider of the second driven shaft section positioned to coact with the center gear of the first driven shaft section and ring gear of the drum positioned over the spider of the second driven shaft section, a drum positioned over the drum positioned over the center gear and spider of the driving shaft and first driven shaft section, respectively, a housing journaled on the driving shaft and positioned over the said impellers, an impeller in the housing positioned to coact with the intermediate impellers, a torque tube connecting the housing through the said drum positioned over the drum of the center gear and spider of the driving shaft and first driven shaft section, means connecting the drum over the drum of the center gear and spider of the driving shaft and first driven shaft section to the drum positioned over the center gear and spider of the first driven shaft section and second driven shaft section, respectively, said second driven shaft section having a splined end extended into the said neutral section, a driven shaft journaled in the said neutral section, and means directly driving the said driven shaft by the said second driven shaft section.

7. In a transmission unit, the combination which comprises a control section, a planetary gear section, and a neutral section, a driving shaft extended through the control section, a driving impeller positioned in said control section and mounted on said driving shaft, a center gear carried by an end of the driving shaft extended into the planetary gear section, a drum having a ring gear therein journaled in said planetary gear section and positioned over the said center gear, a first driven shaft section journaled in said planetary gear section, a spider carried by the first driven shaft section, intermediate gears journaled on the spider and positioned in meshing relation with the center and ring gears, an intermediate driven impeller in the control section positioned to coact with the driving impeller and journaled through a torque tube on the said driving shaft, means connecting the torque tube to the said drum, a second driven shaft section also journaled in the planetary gear section of the housing, a spider carried by the second driven shaft section, a drum having a ring gear therein journaled in said planetary gear section and positioned over the said spider of the second driven shaft section, a center gear carried by the end of said first driven shaft section positioned to coact with the spider of the second driven shaft section, intermediate gears journaled on the spider of the second driven shaft section positioned to coact with the center gear of the first driven shaft section and ring gear of the drum positioned over the spider of the second driven shaft section, a drum positioned over the drum positioned over the center gear and spider of the driving shaft and first driven shaft section, respectively, a housing journaled on the driving shaft and positioned over the said impellers, an impeller in the housing positioned to coact with intermediate impellers, a torque tube connecting the housing through the said drum positioned over the drum of the center gear and spider of the driving shaft and first driven shaft section, means connecting the drum over the drum of the center gear and spider of the driving shaft and first driven shaft section to the drum positioned over the center gear and spider of the first driven shaft section and second driven shaft section, respectively, said second driven shaft section having a splined end extended into the said neutral section, a driven shaft journaled in the said neutral section, and means directly driving the said driven shaft by the said second driven shaft section.

8. A transmission unit comprising a controlling section, a planetary gear section, and a neutral section, a driving shaft extended through the control section, a driving impeller positioned in said control section and mounted on said driving shaft, a center gear carried by an end of the driving shaft extended into the said planetary gear section, a drum having a ring gear therein journaled in said planetary gear section and positioned over the said center gear, a driven shaft section journaled in said planetary gear section, a spider carried by the driven shaft, intermediate gears journaled on the spider and positioned in meshing relation with the center and ring gears, a driven impeller in the control section positioned to coact with the driving impeller and journaled through a torque tube on the driving shaft, means connecting the torque tube to the said drum, a driven shaft journaled in the neutral section of the housing, a bevel gear splined to and slidably mounted on the said driven shaft, coacting bevel gear splined to and mounted on the said driven shaft section, a brake for holding the bevel gear on the said driven shaft section, a bevel pinion positioned to mesh with the bevel gears on the driven shaft section and driven shaft, and means actuating the bevel pinion into meshing relation with the gear, said actuating means also actuating the bevel gear of the driven shaft into driving relation with the driven shaft section with withdrawal of the bevel pinion from meshing position with the bevel gear.

9. A transmission comprising a control section, a planetary gear section, and a neutral section, a driving shaft extended through the control section and into the planetary gear section, a driving impeller positioned in said control section and mounted on said driving shaft, a sun gear carried by an end of the driving shaft extended into the planetary gear section, a spider rotatably mounted in said planetary gear section, an inner torque tube rotatably mounted on said driving shaft, driven means in the control section mounted on said torque tube and positioned to coact with the driving impeller, an orbit gear in the planetary gear section mounted on said inner torque tube and positioned around the sun gear, intermediate gears rotatably mounted on said spider and positioned in meshing relation with the sun and orbit gears, driven means positioned in the neutral section of the housing, a second sun gear rotatably mounted in the planetary gear section, a second spider rotatably mounted in said planetary gear section, an outer torque element extended from said control section to the second spider of the planetary gear section, a second driving impeller carried by said driven means in the control section, a second driven means carried by said outer torque element and positioned to coact with said second driving impeller, a second orbit gear concentric with said second sun gear and rotatably mounted in the planetary gear section, intermediate gears rotatably mounted on the second spider and positioned in meshing relation with the second sun gear and second orbit gear, and means for driving said driven means of the neutral section by the second spider.

References Cited in the file of this patent

UNITED STATES PATENTS

| | | |
|---|---|---|
| 1,704,896 | Kizziar | Mar. 12, 1929 |
| 2,041,446 | Wharton | May 19, 1936 |
| 2,131,619 | Duffield | Sept. 27, 1938 |
| 2,290,319 | Dodge | July 21, 1942 |
| 2,312,849 | Pollard | Mar. 2, 1943 |
| 2,319,706 | Reit | May 18, 1943 |
| 2,325,876 | Pollard | Aug. 3, 1943 |
| 2,366,063 | Seybold | Dec. 26, 1944 |
| 2,437,333 | Pollard | Mar. 9, 1948 |
| 2,454,014 | Seybold | Nov. 16, 1948 |
| 2,519,022 | Burtnett | Aug. 15, 1950 |
| 2,523,619 | Grebb | Sept. 26, 1950 |
| 2,551,746 | Iavelli | May 8, 1951 |

FOREIGN PATENTS

| | | |
|---|---|---|
| 896,407 | France | Feb. 21, 1945 |